US012650561B2

(12) United States Patent　　　(10) Patent No.:　US 12,650,561 B2
Arao et al.　　　　　　　　　　　　(45) Date of Patent:　　　Jun. 9, 2026

(54) OPTICAL CONNECTOR

(71) Applicants: SUMITOMO ELECTRIC INDUSTRIES, LTD., Osaka (JP); SUMITOMO ELECTRIC OPTIFRONTIER CO., LTD., Yokohama (JP)

(72) Inventors: Yuki Arao, Osaka (JP); Tetsu Morishima, Osaka (JP); Masahiro Shibata, Yokohama (JP)

(73) Assignees: SUMITOMO ELECTRIC INDUSTRIES, LTD., Osaka (JP); SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 292 days.

(21) Appl. No.: 18/569,304

(22) PCT Filed: Jun. 9, 2022

(86) PCT No.: PCT/JP2022/023342
§ 371 (c)(1),
(2) Date: Dec. 12, 2023

(87) PCT Pub. No.: WO2023/281979
PCT Pub. Date: Jan. 12, 2023

(65) Prior Publication Data
US 2024/0272374 A1　　　Aug. 15, 2024

(30) Foreign Application Priority Data

Jul. 7, 2021　(JP) ................................. 2021-112955

(51) Int. Cl.
G02B 6/38　　　　　(2006.01)

(52) U.S. Cl.
CPC ......... *G02B 6/3851* (2013.01); *G02B 6/3871* (2013.01); *G02B 6/3874* (2013.01)

(58) Field of Classification Search
None
See application file for complete search history.

(56) References Cited

U.S. PATENT DOCUMENTS 4,422,467　A　12/1983　Wu
5,216,733　A　6/1993　Nagase et al.
(Continued)

FOREIGN PATENT DOCUMENTS

JP　　H04-281409 A　10/1992
JP　　2013-522679 A　6/2013
WO　2020/149262 A1　7/2020

OTHER PUBLICATIONS

Morishima et al.; "Simple-Structure LC-Type Multi-Core Fiber Connector with Low Insertion Loss;" OFC; 2020; pp. 1-3.
(Continued)

*Primary Examiner* — Jerry Rahll
(74) *Attorney, Agent, or Firm* — Oliff PLC

(57)　　　　　　　ABSTRACT

An optical connector of one embodiment includes an optical fiber, a ferrule assembly, and a housing provided with a positioning part on an inner wall surface for suppressing a fluctuation in an aligning state of the optical fiber with respect to the housing. The positioning part includes an inclined surface and a facing surface which contact a part of the ferrule assembly. The ferrule assembly includes a ferrule, and a sleeve member. The sleeve member is constituted by a sleeve and a flange which has edges contacting the inclined surface and the facing surface respectively. Of an outer peripheral portion of the flange, a portion including the edges facing at least one of the inclined surface and the facing surface includes a set including a deformation absorb- (Continued)

ing part and two contact portions disposed on both sides of the deformation absorbing part.

6 Claims, 10 Drawing Sheets

(56)     References Cited

U.S. PATENT DOCUMENTS

| | | | | |
|---|---|---|---|---|
| 6,287,018 B1 * | 9/2001 | Andrews | .............. | G02B 6/3843 |
| | | | | 385/139 |
| 6,663,293 B2 * | 12/2003 | Lampert | .............. | G02B 6/3843 |
| | | | | 385/139 |
| 2002/0085815 A1 * | 7/2002 | Shinagawa | .......... | G02B 6/3871 |
| | | | | 385/60 |
| 2004/0105625 A1 * | 6/2004 | Ueda | .................... | G02B 6/3851 |
| | | | | 385/78 |
| 2007/0292084 A1 * | 12/2007 | Gurreri | ................ | G02B 6/3869 |
| | | | | 385/78 |
| 2011/0229085 A1 * | 9/2011 | Bradley | .............. | G02B 6/3871 |
| | | | | 29/857 |
| 2012/0219254 A1 | 8/2012 | Bradley et al. | | |
| 2015/0331202 A1 * | 11/2015 | Rosson | ................ | G02B 6/3826 |
| | | | | 385/80 |
| 2021/0333483 A1 | 10/2021 | Morishima | | |

OTHER PUBLICATIONS

Morishima et al.; "Simple-Structure LC-Type Multi-Core Fiber Connector with Low Insertion Loss"; 2020; pp. 1-3.

* cited by examiner

FIG. 6

| | BEFORE INTERFERENCE-FITTING | AFTER INTERFERENCE-FITTING |
|---|---|---|
| MU TYPE | | |
| LC TYPE | | |
| SC TYPE | | |

FIG. 7

| | BEFORE INTERFERENCE-FITTING | AFTER INTERFERENCE-FITTING |
|---|---|---|
| MU TYPE | 130A (500)<br>131a (521a)<br>L$_R$ (E2) | 130A (500)<br>220<br>20B<br>131a (521a)<br>L$_R$ (E2) |
| LC TYPE | 130B<br>132a<br>L$_R$ (E2) | 220<br>130B<br>132a  20B<br>L$_R$ (E2) |
| SC TYPE | 130C<br>133a<br>L$_R$ (E2) | 130C<br>220<br>133a L$_R$ (E2)<br>20B |

FIG. 8

OPTICAL CONNECTOR

DESCRIPTION

Technical Field

The present disclosure relates to an optical connector. This application claims priority based on Japanese Patent Application No. 2021-112955 filed on Jul. 7, 2021, and the entire contents of the Japanese patent application are incorporated herein by reference.

Background Art

A single core optical connector attached to a tip portion of an optical fiber such as a multi-core optical fiber (hereinafter referred to as "MCF") or a polarization maintaining optical fiber (hereinafter referred to as "PMF") is provided with a structure for maintaining an aligning state of the optical fiber with respect to the optical connector. For example, according to a push-pull type optical connector disclosed in the following PTL 1 and Non-PTL 1, a structure is adopted in which a ferrule assembly fixed to the tip portion with the tip portion of the optical fiber inserted is accommodated in a housing, and a flange constituting a part of the ferrule assembly is pressed against a positioning part provided on a housing inner wall surface by using a spring member. In the push-pull type optical connector having such a structure, the ferrule assembly accommodated in the housing is prevented from being fluctuated in the accommodation position in the housing by the elastic force (restoring force) of the spring member, and the azimuthal fluctuation around the fiber axis (central axis of the optical fiber to which the ferrule assembly is fixed) is suppressed(aligning state is maintained).

CITATION LIST

Patent Literature

PTL 1: Japanese Unexamined Patent Application Publication No. H04-281409

Non Patent Literature

[Non-PTL 1] Tetsu Morishima, et al., "Simple-Structure LC-Type Multi-Core Fiber Connector with Low Insertion Loss", OFC2020, p. Th3I. 2

SUMMARY OF INVENTION

The optical connector of the present disclosure includes an optical fiber, a ferrule assembly attached to a tip portion of the optical fiber, and a housing. The housing has an inner wall surface defining a space in which the ferrule assembly is to be accommodated and a positioning part defining an accommodation position of the ferrule assembly. The positioning part is provided on the inner wall surface, and is defined by an inclined surface and a facing surface. The inclined surface is inclined with respect to a central axis of the tip portion of the optical fiber and is a surface with which a part of the ferrule assembly is to contact. The facing surface is positioned on a side opposite to the inclined surface with respect to the ferrule assembly and is a surface with which a part of the ferrule assembly is to contact. The ferrule assembly includes a ferrule, and a sleeve member. The ferrule is attached to the tip portion including an end surface of the optical fiber. The sleeve member includes a sleeve having a front end surface and a rear end surface facing each other and a flange attached on an outer peripheral surface of the sleeve. In addition, the sleeve has a through hole connecting the front end surface and the rear end surface to each other and with the optical fiber passing through the through hole, receives a part of the ferrule from a side where the front end surface is provided. The flange includes edges at least a part of which contacts the inclined surface and the facing surface of the positioning part respectively. Especially, of an outer peripheral portion of the flange, a portion including the edges facing at least one of the inclined surface and the facing surface of the positioning part includes a set including a deformation absorbing part and two contact portions. The deformation absorbing part is provided for suppressing deformation of the flange. The contact portions are disposed on both sides of the deformation absorbing part, and are configured to contact at least one of the inclined surface and the facing surface of the positioning part.

BRIEF DESCRIPTION OF THE DRAWINGS

FIG. 6 is a view showing states before and after sleeve interference-fitting of a sleeve member (sleeve+flange) applied to various optical connectors (MU type, LC type, SC type) in the ferrule assembly of the comparative example.

FIG. 7 is a view showing states before and after sleeve interference-fitting of the sleeve member applied to various embodiments (MU type, LC type, SC type) in the ferrule assembly of the optical connector of the present disclosure (a configuration in which a setting reference line $L_R$ defined by a facing surface 20B of a positioning part coincides with edge line E2 of flange).

FIG. 8 is a view showing states before and after sleeve interference-fitting of the sleeve member applied to various embodiments (MU type, LC type, and SC type) in the ferrule assembly of the optical connector of the present disclosure (a configuration in which setting reference line $L_R$ defined by an inclined surface 20A of the positioning part coincides with edge line E1 of flange).

DETAILED DESCRIPTION

Figure 1:
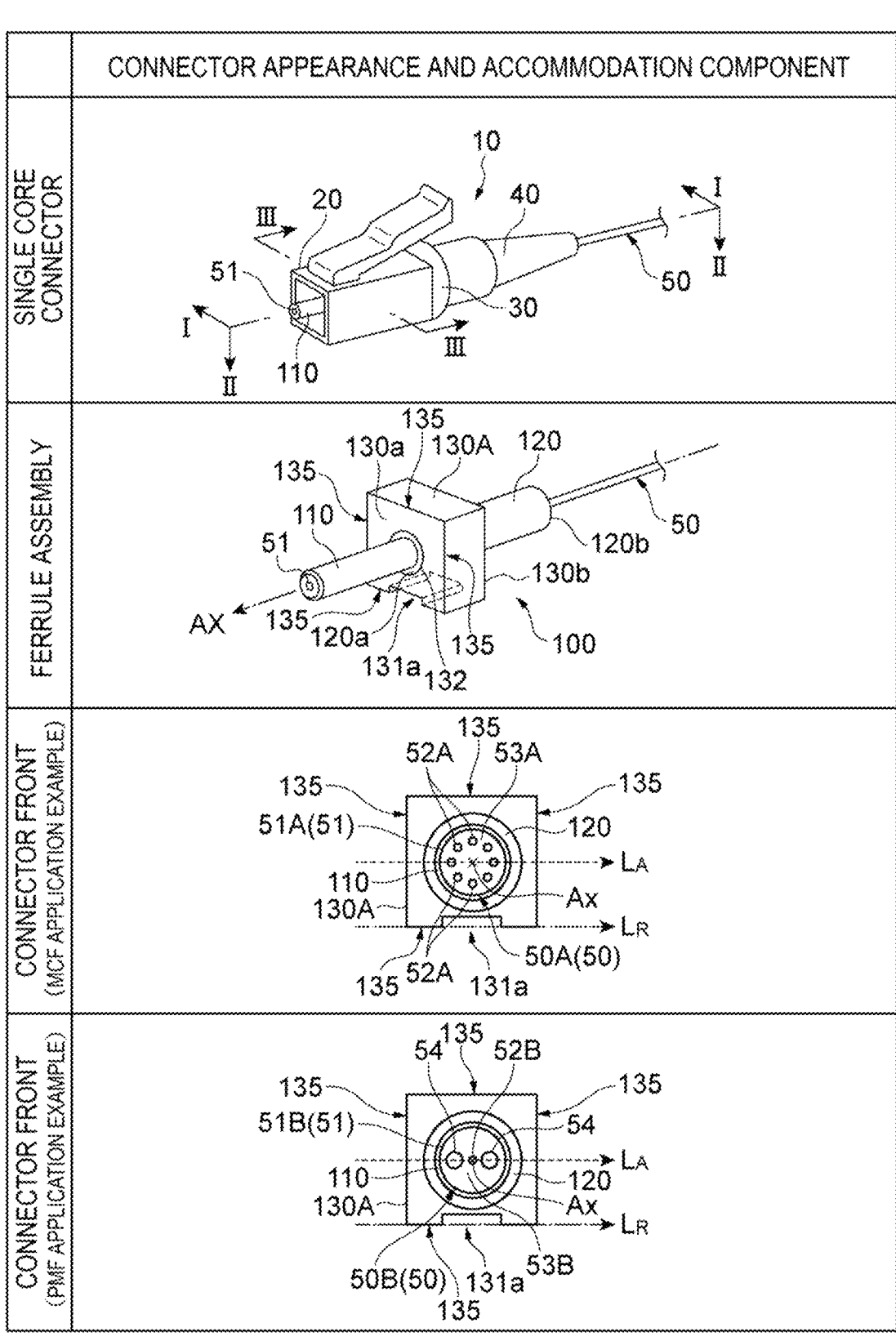
FIG. 1 is a view showing the structure of the main part of the optical connector of the present disclosure.

Problems to be Solved by Present Disclosure

As a result of studies on the above-described conventional techniques, the inventors have found the following problems. For example, the ferrule assembly disclosed in PTL 1 constituted by a ferrule fixed to a tip portion of an optical fiber, a sleeve which receives the ferrule at an opening of a front end surface, and a flange attached to the sleeve. Additionally, PTL 1 discloses a structure in which a protrusion for preventing the flange from moving toward the ferrule is provided on the outer peripheral surface of the sleeve. In the push-pull type optical connector, the flange of the ferrule assembly having the above-described structure, in particular, the linear edge is pushed against the positioning part provided on the housing inner wall by the spring member accommodated in the housing rear part. Therefore, according to the push-pull type optical connector, the ferrule assembly is held at a predetermined position with respect to the housing, and at the same time, the aligning state of the optical fiber is fixed with respect to the optical connector.

However, in the push-pull type optical connector disclosed in PTL 1, when a ferrule assembly is assembled through a step of bonding in a state where a component on a central axis side is inserted into a component on an outer peripheral side, an outer peripheral portion of a flange may be deformed due to thermal expansion or contraction of an adhesive used for fixing the components. In addition, in the case of a ferrule assembly including a plurality of metal components, since a step of interference-fitting one metal component to the other metal component is performed, the outer peripheral portion of the flange may be deformed. When the outer peripheral portion of the flange is deformed, the contact state between the positioning part provided on the housing inner wall and the edge of the flange becomes unstable, and as a result, the aligning state of the optical fiber with respect to the housing cannot be maintained.

The present disclosure has been made to solve the above-described problem, and an object of the present disclosure to provide the optical connector having the structure for suppressing a fluctuation in the aligning state of the optical fiber with respect to the housing.

Advantageous Effects of Present Disclosure

According to the optical connector of the present disclosure, the fluctuation of the aligning state of the optical fiber with respect to the housing can be suppressed.

DESCRIPTION OF EMBODIMENTS OF THE PRESENT DISCLOSURE

At the outset, each of the embodiments of the present disclosure is individually listed and described.

(1) The optical connector of the present disclosure includes, as one aspect thereof, an optical fiber, a ferrule assembly attached to a tip portion of the optical fiber, and a housing. The housing has an inner wall surface defining a space in which the ferrule assembly is to be accommodated and a positioning part defining an accommodation position of the ferrule assembly. The positioning part is provided on the inner wall surface, and is defined by an inclined surface and a facing surface. The inclined surface is inclined with respect to a central axis of the tip portion of the optical fiber and is a surface with which a part of the ferrule assembly is to contact. The facing surface is positioned on a side opposite to the inclined surface with respect to the ferrule assembly and is a surface with which a part of the ferrule assembly is to contact. The ferrule assembly includes a ferrule, and a sleeve member. The ferrule is attached to the tip portion including an end surface of the optical fiber. The sleeve member includes a sleeve having a front end surface and a rear end surface facing each other and a flange attached on an outer peripheral surface of the sleeve. In addition, the sleeve has a through hole connecting the front end surface and the rear end surface to each other and receives a part of the ferrule from a side where the front end surface is provided. It is noted that the timing at which the ferrule is attached to the tip portion of the optical fiber is not particularly limited in terms of structure. For example, the ferrule may be attached to the tip portion including the end surface of the optical fiber inserted into the through hole with a part of the ferrule inserted into the through hole. Alternatively, a part of the ferrule may be inserted into the through hole with the ferrule attached to the tip portion of the optical fiber (in a state where the ferrule passes through the through hole of the sleeve) in advance. The flange includes edges at least a part of which contacts the inclined surface and the facing surface of the positioning part respectively. Especially, of an outer peripheral portion of the flange, a portion including the edges facing at least one of the inclined surface and the facing surface of the positioning part includes a set including a deformation absorbing part and two contact portions. The deformation absorbing part is provided for suppressing deformation of the flange, particularly the outer peripheral portion of the flange. The contact portions are disposed on both sides of the deformation absorbing part, and are configured to contact at least one of the inclined surface and the facing surface of the positioning part.

When the ferrule assembly accommodated in the housing of the optical connector is assembled through a bonding step between each components, the outer peripheral portion of the flange may be deformed due to thermal expansion or contraction of an adhesive used for fixing the components. In addition, in the case of the ferrule assembly including a plurality of metal parts, since a interference-fitting step is performed between the metal parts, the outer peripheral portion of the flange may be deformed. However, according to the optical connector of the present disclosure, since the deformation absorbing part is provided at the outer peripheral portion of the flange, the contact state between the two contact portions disposed on both sides of the deformation absorbing part and the surface of the positioning part is stably maintained. As a result, according to the optical connector of the present disclosure, the aligning state of the optical fiber with respect to the housing can be maintained.

(2) As an embodiment of present disclosure, it is preferable that the deformation absorbing part includes a cutout part for separating a part of the flange from the positioning part by a predetermined distance. In this case, even if the flange is deformed, the deformation portion thereof can be prevented from directly contacting the inclined surface of the positioning part, so that the aligning state of the optical fiber with respect to the housing can be maintained.

(3) As an aspect of the present disclosure, the sleeve member may be constituted by a single member made of a plastic material (synthetic resin), a metal material or the like, and the sleeve and the flange may be each a portion of the single member (a resin-molded part or a metal-molded part). In this case, it is possible to reduce deformation of the outer peripheral portion of the flange caused by adhesion of the ferrule to the sleeve member or interference-fitting of the metal ferrule to the metal sleeve member.

(4) As one aspect of the present disclosure, the optical connector may further include an elastic body contacting the flange from a side where the rear end surface of the sleeve is provided, the elastic body being provided for pushing the edges of the flange against the inclined surface of the positioning part. Accordingly, it is possible to achieve a push-pull type optical connector in which the installation position of the ferrule assembly in the housing is stably fixed using the elastic body.

(5) As an aspect of the present disclosure, it is preferable that the optical fiber may be a multi-core optical fiber or a polarization maintaining optical fiber as the optical fiber that requires alignment along a circumferential direction around its central axis (fiber axis). As described above, since the flange deformation of the ferrule assembly in the optical connector of the present disclosure is effectively suppressed, the aligning state of the optical fiber can be favorably maintained.

The above mentioned, each aspect listed above in this "Description of Embodiments of Present Disclosure" is applicable to each and every remaining embodiment, or to every combination of these remaining embodiments.

Details of Embodiments of Present Disclosure

Hereinafter, a specific structure of an optical connector according to the present disclosure is described in detail with reference to the accompanying drawings. It is noted that the present invention is not limited to these examples, but is defined by the scope of claims, and is intended to include all modifications within the meaning and scope equivalent to the scope of claims. Furthermore, in the description of the drawings, the same elements are denoted by the same reference numerals, and redundant description thereof is omitted.

The ferrule assembly described below, which constitutes a part of the optical connector of the present disclosure, includes a ferrule and a sleeve member. The ferrule is preferably made of a ceramic material or a metal material. The sleeve member includes a separable sleeve member in which the sleeve and the flange are separated from each other or an integrated sleeve member having portions corresponding to the sleeve and the flange, respectively, and is preferably made of a plastic material or a metal material, for example. In the case of a separable sleeve member, a combination of plastic material and metal material is also applicable. Regarding the assembly of the ferrule assembly, the components can be fixed to each other by, for example, an adhesive or interference-fitting. In FIGS. 1 to 10 described below, at least a sleeve member (a sleeve and a flange) among constituent members of the ferrule assembly is made of a metal material, and the constituent members are fixed to each other by interference-fitting. Further, the ferrule is made of a metal material or ceramics, and the ferrule is also interference-fitted to the sleeve member.

FIG. 1 is a view showing a structure of a main part of the optical connector of the present disclosure (in FIG. 1, referred to as "Connector Appearance and Accommodation Component"). Specifically, an uppermost row (in FIG. 1, referred to as a "Single core Connector") shows an example of the appearance of an optical connector 10 of a push-pull type as an example of the optical connector of the present disclosure. The second row (referred to as "Ferrule Assembly" in FIG. 1) shows the structure of a ferrule assembly 100 disposed inside optical connector 10. In the third row (in FIG. 1, referred to as "Connector Front (MCF application example)"), a front view of optical connector 10 including an end surface of an MCF 50A (multi-core optical fiber) is shown as an example of an optical fiber 50 (optical fiber requiring aligning) to which a ferrule 110 is attached. In a lowermost row (in FIG. 1, referred to as "Connector Front (PMF Application Example)"), a front view of optical connector 10 including an end surface of a PMF 50B (polarization maintaining optical fiber) is shown as another example of optical fiber 50 to which ferrule 110 is attached.

The housing of optical connector 10 shown in the uppermost row of FIG. 1 is constituted by a front housing 20 and a rear housing 30, and ferrule assembly 100 including ferrule 110 and a spring member for stably maintaining the accommodation position of ferrule assembly 100 are accommodated in the housing. Ferrule 110 is attached to a tip portion (a glass fiber 51 from which a resin coating is removed) including an end surface of optical fiber 50, and boots 40 is attached to rear housing 30 to protect optical fiber 50 extending from rear housing 30.

Ferrule assembly 100 shown in the second row of FIG. 1 is accommodated in a housing constituted by front housing 20 and rear housing 30, and includes ferrule 110 and a sleeve member. The sleeve member is constituted by a sleeve 120 and a flange 130A. Optical fiber 50 includes glass fiber 51 and the resin coating provided on an outer peripheral surface of glass fiber 51, and the resin coating covering the tip portion including an end surface of optical fiber 50 is removed. Ferrule 110 is attached to the tip portion of optical fiber 50 from which the resin coating is removed by using an adhesive (for example, a thermosetting resin or an ultraviolet curable resin). Sleeve 120 has a front end surface 120a and a rear end surface 120b opposite to each other and a through hole. The rear portion of ferrule 110 is interference-fitted into the through hole of sleeve 120 from a side where the front end surface is provided in a state where front end surface 120a and rear end surface 120b are connected and optical fiber 50 passes through the through hole. Alternatively, optical fiber 50 may be inserted into ferrule 110 after the rear portion of ferrule 110 is interference-fitted toward the front end surface of the through hole of sleeve 120. Flange 130A is provided at the front side of sleeve 120, and has a through hole 132, a front surface 130a coinciding with front end surface 120a of sleeve 120, rear surface 130b opposite to front surface 130a, and an outer peripheral surface. A side where Front end surface 120a of sleeve 120 is provided is interference-fitted into through hole 132 of flange 130A from rear surface 130b toward front surface 130a. Alternatively, rear end surface 120b of sleeve 120 may be interference-fitted from front surface 130a of the toward rear surface 130b.

Further, front surface 130a of flange 130A includes an edge 135 contacting an inclined surface and a facing surface (a surface opposite to the inclined surface with respect to flange 130A) of the positioning part of the housing. When the boundary between front surface 130a portion and the outer peripheral surface is chamfered, the "Edge" includes the chamfered portion, and a part of the "Edge" including the chamfered portion contacts the inclined surface of the positioning part of the housing. Rear surface 130b of flange 130A contacts spring member 140 to be described later. In detail, a cutout part 131a is provided as a deformation absorbing part (a part that absorbs deformation generated in flange 130A due to interference-fitting of front end surface 120a side of sleeve 120 into through hole 132 and maintains a linear shape of edge 135 of a flange 130A) at edge 135 facing the inclined surface or the facing surface of edge 135 (four sides of front surface 130a) on front surface 130a side of flange 130A. Therefore, at edge 135 where cutout part 131a is provided, two contact portions disposed on both sides of cutout part 131a contact with the surface (at least one of the inclined surface and the facing surface) of the positioning part which faces edge 135.

In the front view (Connector Front (MCF Application Example)) of optical connector 10 shown in the third row of FIG. 1, the end surface of MCF 50A as optical fiber 50 requiring aligning, ferrule 110 attached to the tip portion (a glass fiber 51A) of MCF 50A, sleeve 120 into which ferrule 110 is inserted, and flange 130A are shown. MCF 50A includes a plurality of cores 52A each extending along a fiber axis AX (central axis of MCF 50A) and a common cladding 53A surrounding each of the plurality of cores 52A. A line $L_A$ indicates a reference direction (a direction of azimuth angle 0°) of rotational aligning of MCF 50A, and a line $L_R$ is a setting reference line (a line defined on the surface of the positioning part) of ferrule assembly 100 along edge 135 of flange 130A. In ferrule assembly 100 including MCF 50A after aligning, line $L_A$ indicating the reference direction and setting reference line $L_R$ are parallel to each other.

In the front view (Connector Front (PMF Application Example)) of optical connector 10 shown in the lowermost row of FIG. 1, the end surface of PMF 50B as optical fiber 50 requiring aligning, ferrule 110 attached to the tip portion (a glass fiber 51B) of PMF 50B, sleeve 120 into which ferrule 110 is inserted, and flange 130A are shown. PMF 50B includes a core 52B extending along fiber axis AX (central axis of PMF 50B), stress applying parts 54 disposed to sandwich core 52B, and a common cladding 53B surrounding core 52B and stress applying parts 54. In ferrule assembly 100 including PMF 50B after aligning, line $L_A$ indicating the reference direction and setting reference line $L_R$ are parallel to each other.

Figure 2:
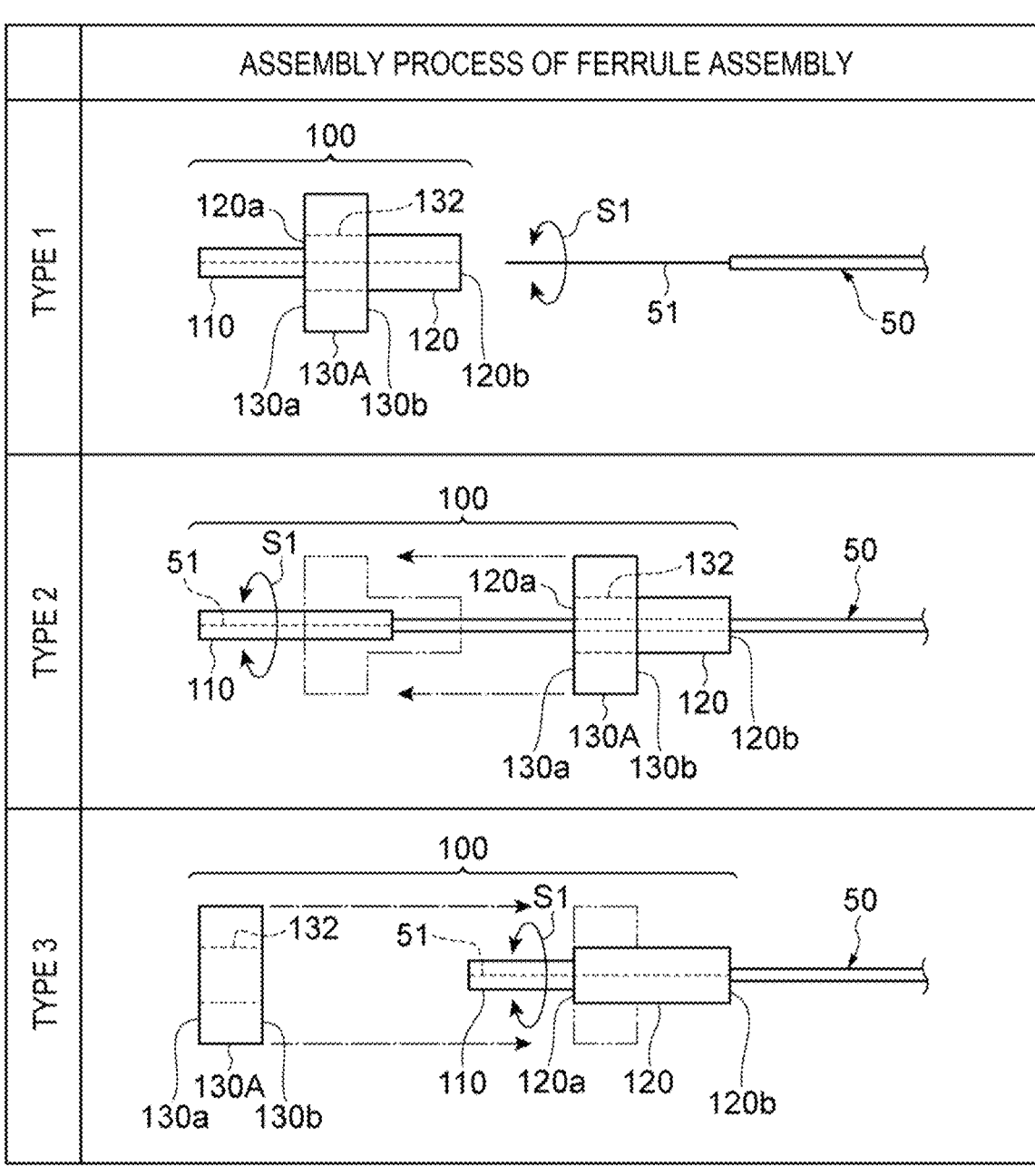
FIG. 2 is a view for explaining various assembly processes (including an aligning operation) of the ferrule assembly.

FIG. 2 is a view for explaining various assembly processes (including aligning operation) of the ferrule assembly (in FIG. 2, referred to as "Assembly Process of Ferrule Assembly"). Specifically, upper row (in FIG. 2, shown as "Type 1") is a view for explaining a method of aligning optical fiber 50 with respect to ferrule assembly 100 which is assembled in advance. The middle row (in FIG. 2, shown as "Type 2") is a view for explaining a method of assembling ferrule assembly 100 by aligning optical fiber 50 with ferrule 110 attached to the tip portion with respect to flange 130A integrated with sleeve 120. The lower row (referred to as "Type 3" in FIG. 2) is a view for explaining a method of assembling ferrule assembly 100 aligning optical fiber 50 with ferrule 110 and sleeve 120 attached to the tip portion with respect to flange 130A.

In "Type 1" shown in the upper row of FIG. 2, the structure which becomes ferrule assembly 100 is assembled before being attached to the tip portion (glass fiber 51) of optical fiber 50. As described above, ferrule assembly 100 is constituted by ferrule 110, sleeve 120 having front end surface 120a and rear end surface 120b, and flange 130A having front surface 130a and rear surface 130b. The rear portion of ferrule 110 is interference-fitted to the opening (opening of the through hole) of front end surface 120a of sleeve 120, and a side where front end surface 120a of sleeve 120 is provided is interference-fitted to through hole 132 of flange 130A in a state where ferrule 110 passes through. When the aligning operation of optical fiber 50, which is performed by rotating optical fiber 50 by a predetermined angle in the direction indicated by an arrow S1, is completed, ferrule 110 of ferrule assembly 100 which has been assembled is attached to the tip portion (glass fiber 51) of aligned optical fiber 50. The front view of ferrule assembly 100 attached to optical fiber 50 after aligning is identical to the front view shown in the third row and the lowermost row of FIG. 1.

In "Type 2" shown in the middle row of FIG. 2, the aligning (rotating operation of optical fiber 50 along the direction indicated by arrow S1) of optical fiber 50 is performed in a state where ferrule 110 is attached to the tip portion (glass fiber 51) of optical fiber 50. During the aligning, optical fiber 50 is maintained in a state of passing through the through hole of the structure (sleeve member) including sleeve 120 and flange 130A, which has been already assembled by interference-fitting sleeve 120 into through hole 132 of flange 130A. When the aligning operation is completed, one end of ferrule 110 attached to the tip portion of optical fiber 50 is interference-fitted into the through hole of sleeve 120 from a side where front end surface 120a of sleeve 120 is provided. The front view of ferrule assembly 100 attached to optical fiber 50 after aligning is identical to the front view shown in the third row and the lowermost row of FIG. 1.

Further, in "Type 3" shown in the lower row of FIG. 2, the aligning (rotating operation of optical fiber 50 along the direction indicated by arrow S1) of optical fiber 50 is performed in a state where the structure including ferrule 110 and sleeve 120 is attached to the tip portion (glass fiber 51) of optical fiber 50. In addition, ferrule 110 is interference-fitted to the opening of front end surface 120a of sleeve 120 while being attached to the tip portion of optical fiber 50. During the aligning, optical fiber 50 is maintained in a state where it passes through the through hole of the structure including ferrule 110 and sleeve 120, which has been already assembled. When the aligning operation is completed, a side (front portion of sleeve 120) where ferrule 110 of the structure (ferrule 110 and sleeve 120) attached to the tip portion of optical fiber 50 is provided is interference-fitted into through hole 132 of flange 130A. The front view of ferrule assembly 100 attached to optical fiber 50 after aligning is identical to the front view shown in the third row and lowermost row of FIG. 1.

Figure 3:
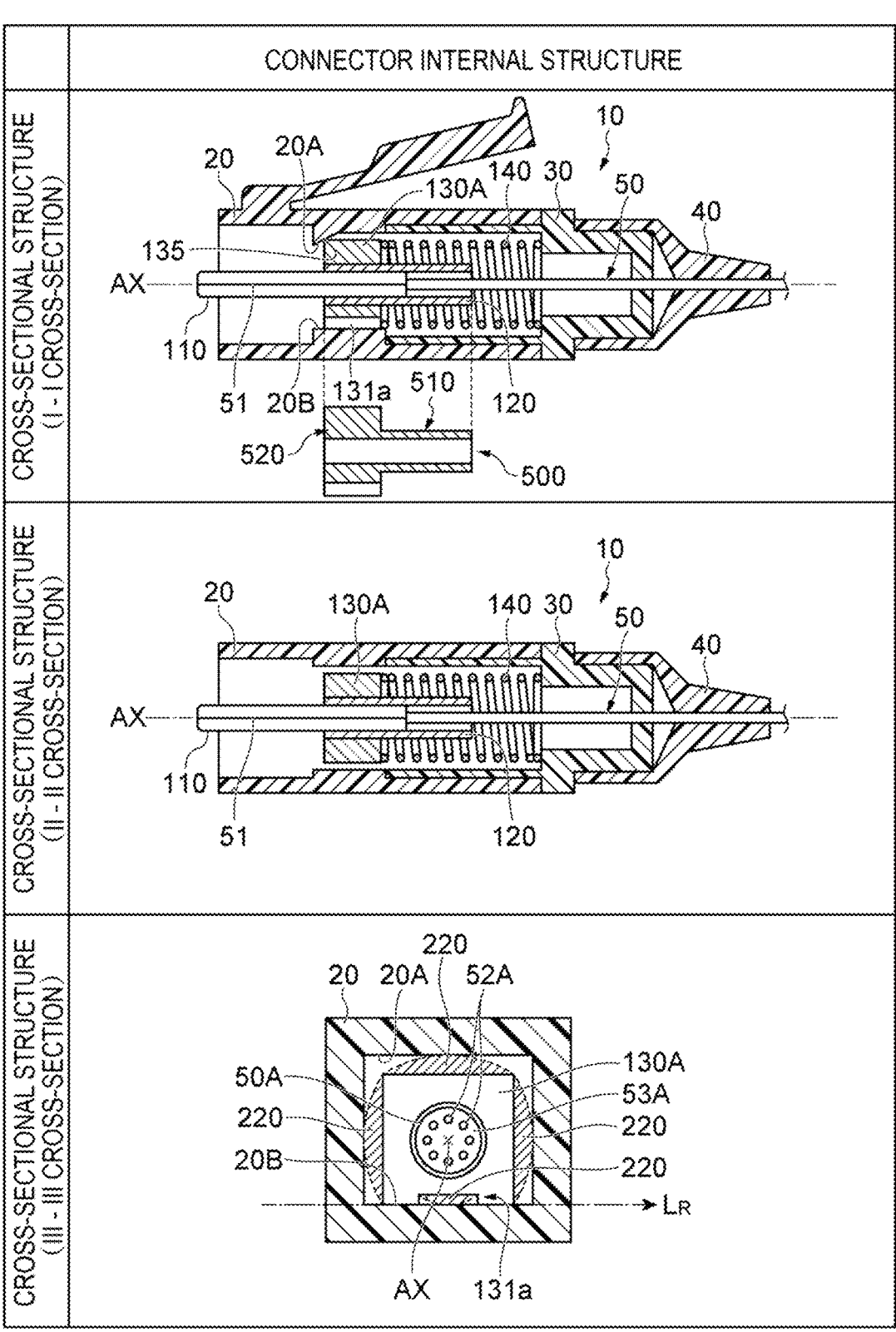
FIG. 3 is a view showing the internal structure of the optical connector of the present disclosure.

FIG. 3 is a view showing the internal structure of the optical connector of the present disclosure (in FIG. 3, referred to as "Connector Internal Structure"). Specifically, the upper row (in FIG. 3, referred to as "Cross-sectional Structure (I-I Cross-section)") is a cross-sectional view of optical connector 10 taken along the line I-I shown in the uppermost row of FIG. 1. The middle row (in FIG. 3, referred to as "Cross-sectional Structure (II-II Cross-section)") is a cross-sectional view of optical connector 10 taken along the line II-II shown in the uppermost row of FIG. 1. The lower row (in FIG. 3, referred to as "Cross-sectional Structure (III-III Cross-Section)") is a cross-sectional view of optical connector 10 taken along the line III-III shown in the uppermost row of FIG. 1.

As shown in the upper row and middle rows of FIG. 3, optical connector 10 has a housing for stably accommodating ferrule assembly 100 attached to the tip portion of optical fiber 50. This housing is constituted by front housing 20 and rear housing 30 fitted into front housing 20. A tip of ferrule 110 constituting a part of ferrule assembly 100 protrudes from the front opening of front housing 20. In addition, the inner wall surface of front housing 20 is provided with inclined surface 20A and facing surface 20B which contact edge 135 of flange 130A of ferrule assembly 100 to be accommodated. A positioning part is defined by inclined surface 20A and facing surface 20B. It is noted that, in the example of FIG. 3, facing surface 20B is a plane parallel to fiber axis AX, but may be a plane inclined to fiber axis AX as in the case of inclined surface 20A. In addition, as shown in the middle row, the inner wall surface of front housing 20 and the side surface of flange 130A are provided with a clearance for allowing manufacturing variations of each part. On the other hand, spring member 140 as an elastic body is accommodated in rear housing 30, and when rear housing 30 is inserted into front housing 20 from the rear side of front housing 20, spring member 140 is compressed by being sandwiched between ferrule assembly 100 accommodated in front housing 20 and the rear portion of rear housing 30. In addition, a through hole for drawing out optical fiber 50 is provided in the rear portion of rear housing 30. Ferrule assembly 100 receives an elastic force from spring member 140 (a restoring force of spring member 140), and edge 135 included in the 130*a* of the front surface of flange 130A is pressed against inclined surface 20A (included in the positioning part) provided on the inner wall surface of front housing 20. At this time, the contact portions disposed on both sides of cutout part 131*a* as the deformation absorbing part come into contact with facing surface 20B of the positioning part.

Cutout part 131*a* may be provided as a deformation absorbing part at each sides (edge 135) defining front surface 130*a* of flange 130A. Spring member 140 contacts rear surface 130*b* of flange 130A. In addition, each edge 135 may be provided with one or more deformation absorbing parts. For example, two contact portions disposed on both sides of corresponding cutout part 131*a* contact facing surface 20B. In this contact state, cutout part 131*a* is separated from facing surface 20B by a predetermined distance.

Although a pair of surfaces (inclined surface 20A and facing surface 20B) is shown as the positioning part in the example of the upper row and the middle row in FIG. 3, the inner wall surface of front housing 20 may be provided with two or more pairs of surfaces (surfaces defining the positioning part) so as to correspond to the each sides defining the shape of front surface 130*a* of flange 130A. The sleeve member in which ferrule 110 is inserted into the opening may be constituted by combining sleeve 120 and flange 130A, or as shown in the upper row of FIG. 3, a portion 510 (hereinafter referred to as a "Sleeve Portion") of an integrated sleeve member 500 formed of a single member may function as a sleeve and another portion 520 (hereinafter referred to as a "Flange Portion") may function as a flange.

When ferrule assembly 100 having the flange structure as described above is disposed inside the housing of optical connector 10, the setting state of flange 130A in front housing 20 is as shown in the lower row of FIG. 3. That is, when ferrule assembly 100 is disposed inside the housing of optical connector 10, the contact portions of flange 130A disposed on both sides of cutout part 131*a* come into contact with facing surface 20B of the positioning part, and as a result, setting reference line $L_R$ of flange 130A and facing surface 20B are maintained to coincide with each other. In the case of a separable sleeve member, a deformation portion 220 is formed on each side of flange 130A due to interference-fitting of ferrule 110 into sleeve 120 and interference-fitting of sleeve 120 into through hole 132 of flange 130A. Also, in the case of integrated sleeve member 500, deformation of flange portion 520 occurs due to interference-fitting of ferrule 110 into sleeve portion 510. However, since deformation portion 220 on the side surface on which cutout part 131*a* is provided is absorbed by cutout part 131*a*, the fluctuation of setting reference line $L_R$ defined by the two contact portions is suppressed. Hereafter, the interference-fitting of ferrule 110 into sleeve 120, the interference-fitting of sleeve 120 into through hole 132 of flange 130A and the interference-fitting of ferrule 110 into sleeve portion 510 are called sleeve interference-fitting of the sleeve member, or sleeve interference-fitting.

Figure 4:
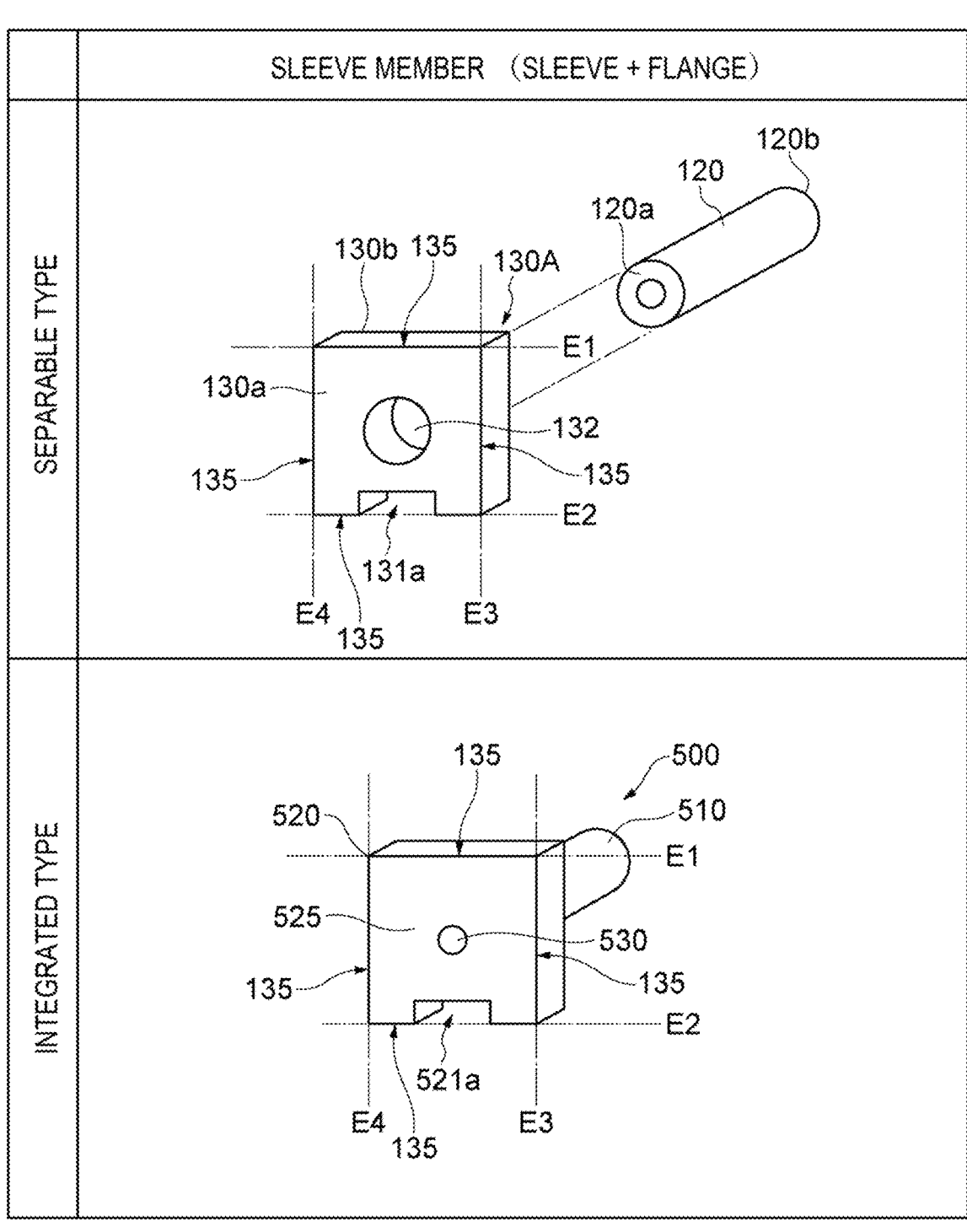
FIG. 4 is a view showing various sleeve member configurations applicable to the ferrule assembly in the optical connector of the present disclosure.

FIG. 4 is a view showing various sleeve member configurations applicable to ferrule assembly in the optical connector of the present disclosure. Specifically, the upper row (in FIG. 4, referred to as "Separable Type") is a view showing a configuration of a separable sleeve member in which sleeve 120 and flange 130A constituting the sleeve member are constituted by separate members. The lower row (in FIG. 4, referred to as "Integrated Type") is a view showing a configuration of an integrated sleeve member in which a flange and a sleeve are integrally formed.

The separable sleeve member shown in the upper row of FIG. 4 is constituted by sleeve 120 and flange 130A. Sleeve 120 has front end surface 120*a*, rear end surface 120*b*, and a through hole connecting front end surface 120*a* and rear end surface 120*b*. Flange 130A has through hole 132 into which front end surface 120*a* side of sleeve 120 is interference-fitted, and has front surface 130*a* and rear surface 130*b*. After interference-fitting sleeve 120, front end surface 120*a* of sleeve 120 substantially coincide with front surface 130*a* of flange 130A (front end surface 120*a* of sleeve 120 may slightly protrude or recess from front surface 130*a* of flange 130A). Front surface 130*a* and rear surface 130*b* are both quadrilateral. In particular, the shape of front surface 130*a* is defined by an edge line E1 to an edge line E4 indicating the position of edge 135 contacting the corresponding positioning part (for example, inclined surface 20A and facing surface 20B shown in the upper row of FIG. 3), and in the illustrated example, a cutout part 131*a* is provided as a deformation absorbing part at edge 135 of flange 130A indicated by edge line E2. In this configuration, two contact portions (portions coinciding with edge line E2) disposed on both sides of cutout part 131*a* contact facing surface 20B of the corresponding positioning part.

Meanwhile, integrated sleeve member 500 shown in the lower row of FIG. 4 includes sleeve portion 510 functioning as a sleeve and flange portion 520 functioning as a flange. In addition, integrated sleeve member 500 is provided with a through hole 530 into which a part of ferrule 110 is interference-fitted in a state where ferrule 110 passes through optical fiber 50 attached to the tip portion. A front surface 525 of flange portion 520 of integrated sleeve member 500 on which the opening of through hole 530 is positioned is quadrangle. In particular, the shape of front surface 525 is defined by edge line E1 to edge line E4 indicating the position of edge 135 contacting the corresponding positioning parts (for example, inclined surface 20A and facing surface 20B of the positioning part shown in the upper row of FIG. 3), and a cutout part 521*a* as the deformation absorbing part is provided at edge 135 of flange portion 520 indicated by edge line E2. In this configuration, of the two contact portions disposed on both sides of cutout part 521*a*, the portion coinciding with edge line E2 contacts with facing surface 20B of the corresponding positioning part.

Figure 5:
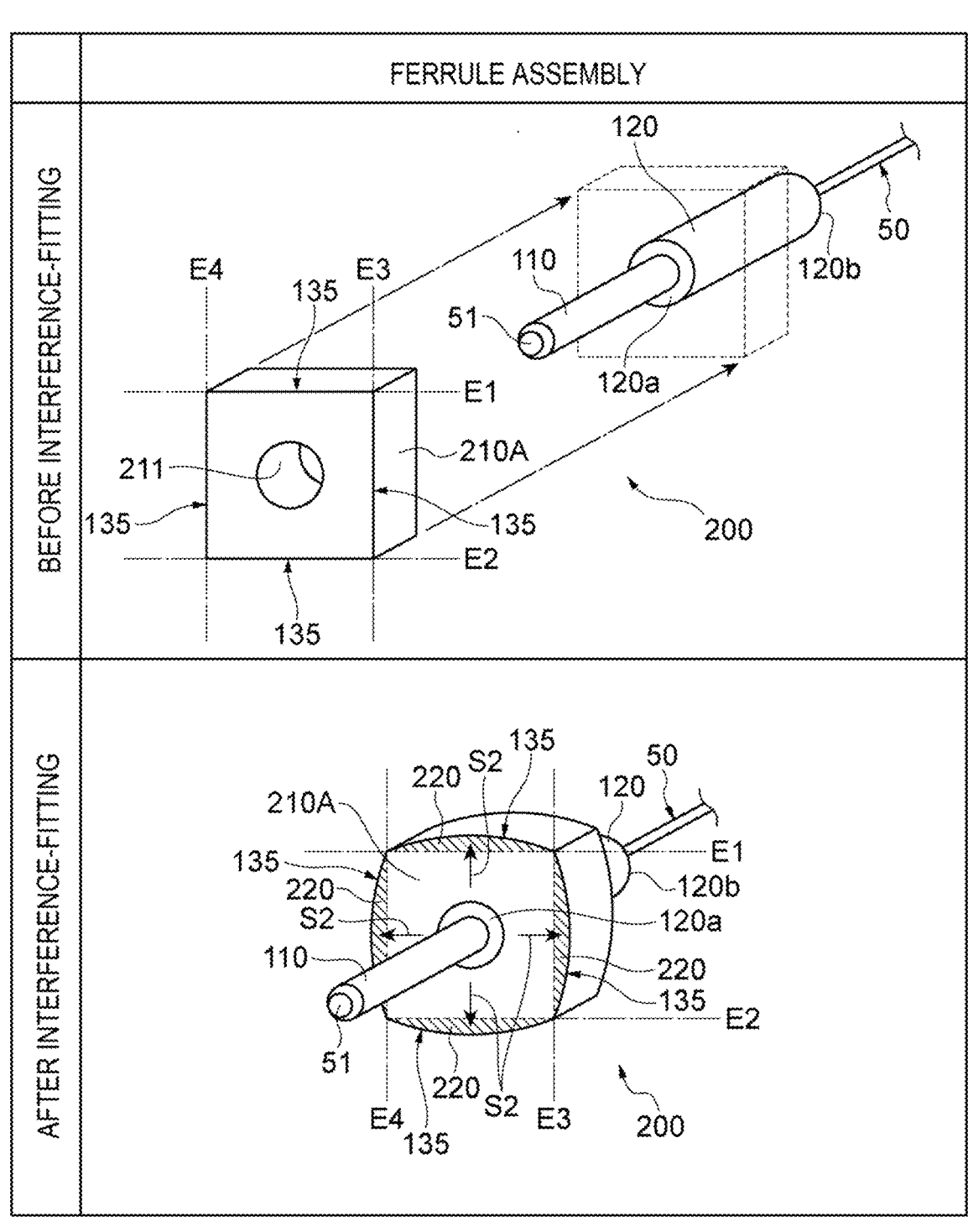
FIG. 5 is a view for explaining a problem of the ferrule assembly according to the comparative example.

FIG. 5 is a view for explaining a problem of the ferrule assembly according to the comparative example. Specifically, the upper row (in FIG. 5, referred to as "Before Interference-fitting") is a view showing a state before interference-fitting the sleeve into the opening of the flange. The lower row (in FIG. 5, shown as "After Interference-fitting") shows the sleeve after interference-fitting into the opening of the flange.

A ferrule assembly 200 according to the comparative example shown in the upper row of FIG. 5 is constituted by ferrule 110 attached to the tip portion of optical fiber 50 and a separable sleeve member. The separable sleeve member is constituted by sleeve 120 to which one end of ferrule 110 is interference-fitted and a flange 210A. Sleeve 120 has front end surface 120a, rear end surface 120b, and a through hole connecting front end surface 120a and rear end surface 120b. Flange 210A has a through hole 211 into which front end surface 120a side of sleeve 120 is interference-fitted. Both sides of flange 210A where the opening of the through hole 211 is positioned are quadrangle. In particular, the shape of a surface (hereinafter referred to as "Flange Surface") positioned on front end surface 120a side of sleeve 120 is defined by edge line E1 to edge line E4 indicating the position of each edge 135. However, in this comparative example, the deformation absorbing part is not provided in any edge 135 of flange 210A indicated by edge line E1 to edge line E4.

As shown in the lower row of FIG. 5, when front end surface 120a side of sleeve 120 is interference-fitted into the through hole 211 of flange 210A, front end surface 120a of sleeve 120 substantially coincides with the flange surface of flange 210A (front end surface 120a of sleeve 120 may slightly protrude or recede from the flange surface of flange 210A). In addition, due to the interference-fitting of sleeve 120, flange 210A is deformed in a direction indicated by an arrow S2, and deformation portion 220 protruding toward the outer side of edge line E1 to edge line E4 is formed. When ferrule assembly 200 is accommodated in the housing of optical connector 10, fiber axis AX2 of the tip portion of optical fiber 50 to which ferrule 110 is attached is inclined with respect to the inner wall surface of the housing. In addition, edge 135 of flange 210A of ferrule assembly 200 according to the comparative example contacts inclined surface 20A and facing surface 20B (surfaces defining the positioning part) provided at the inner wall of the housing substantially at one point due to the curvature of edge 135 caused by deformation portion 220. In this case, with respect to inclined surface 20A and facing surface 20B, ferrule assembly 200 allows for the azimuthal fluctuation around fiber axis AX2, and the alignment state of optical fiber 50 with respect to optical connector 10 becomes unstable.

Hereinafter, with reference to FIGS. 6 to 10, technical effects of ferrule assembly 100 applicable to the optical connector of the present disclosure are described in comparison with ferrule assembly 200 according to the comparative example.

FIG. 6 is a view showing states before and after sleeve interference-fitting of the sleeve member (sleeve+flange) applied to various optical connectors (MU type, LC type, SC type) in the ferrule assembly of the comparative example. Specifically, the upper row of FIG. 6 (in FIG. 6, referred to as "MU Type") is a view showing, as a comparative example, states of the sleeve member applied to the MU type optical connector before and after sleeve interference-fitting. The middle row of FIG. 6 (in FIG. 6, referred to as "LC Type") is a view showing, as a comparative example, states of the sleeve member applied to the LC type optical connector before and after sleeve interference-fitting. The lower row of FIG. 6 (in FIG. 6, referred to as "SC Type") is a view showing, as a comparative example, states of the sleeve member applied to the SC type optical connector before and after sleeve interference-fitting. In addition, each edge of flange 210A, flange 210B, and flange 210C shown in FIG. 6 corresponds to edge 135 at the front surface side of flange 210A shown in FIG. 5.

FIG. 7 is a view showing states before and after sleeve interference-fitting of the sleeve member applied to various embodiments (MU type, LC type and SC type) as the ferrule assembly of the optical connector of the present disclosure, and shows a structure in which setting reference line $L_R$ defined by facing surface 20B of the positioning part coincides with edge line E2 of flange 130A. Specifically, the upper row of FIG. 7 (in FIG. 7, referred to as "MU Type") is a view showing, as one embodiment, states before and after sleeve interference-fitting of the sleeve member applied to the MU type optical connector. The middle row of FIG. 7 (in FIG. 7, referred to as "LC Type") is a view showing, as one embodiment, states of the sleeve member applied to the LC type optical connector before and after sleeve interference-fitting. The lower row of FIG. 7 (in FIG. 7, referred to as "SC Type") is a view showing, as one embodiment, states of the sleeve member applied to the SC type optical connector before and after sleeve interference-fitting. It is noted that, each edge of flange 130A, flange 130B, and flange 130C shown in FIG. 7 corresponds to edge 135 on the front surface side of flange 130A or flange portion 520 shown in FIG. 4.

Figure 8:
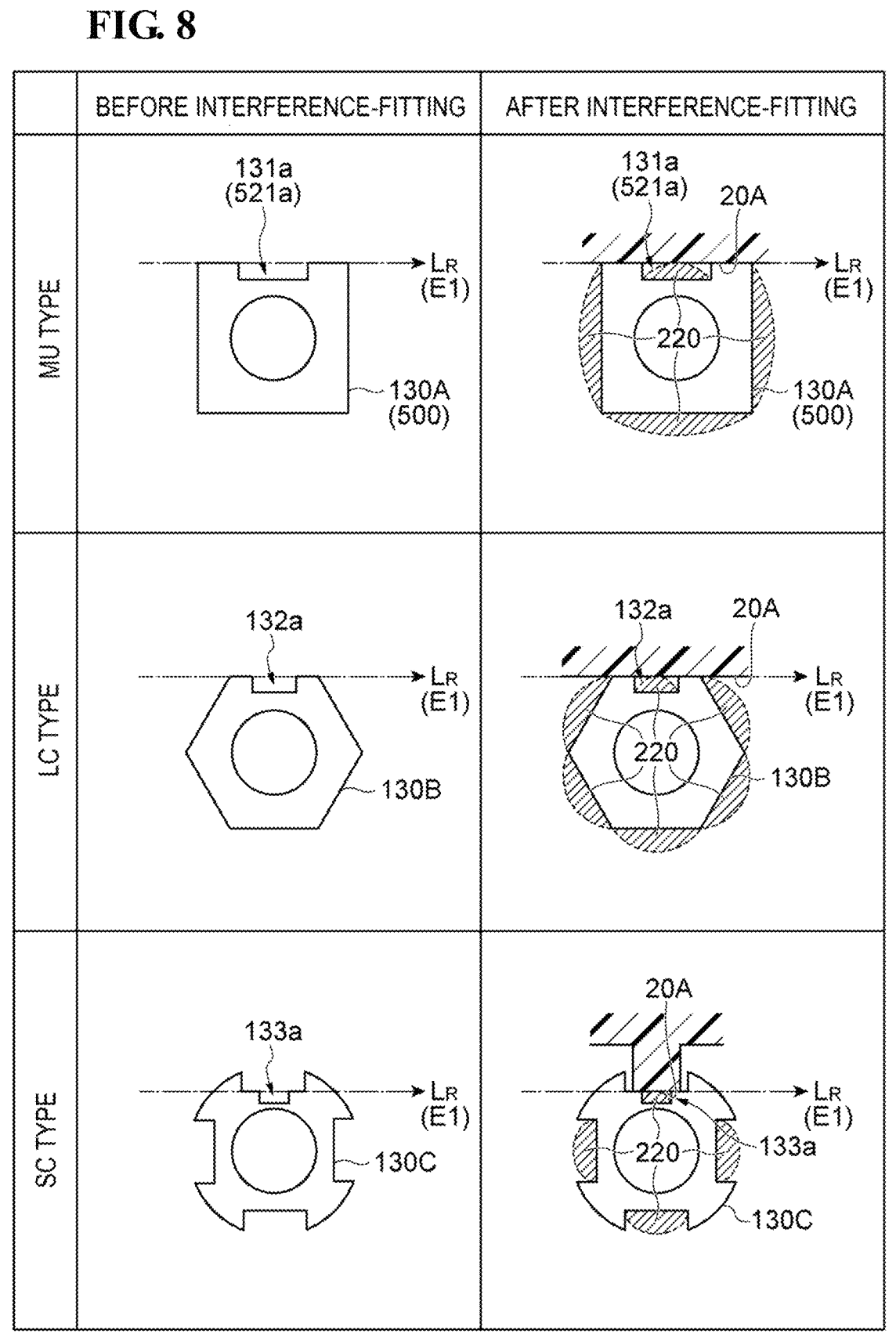

FIG. 8 is a view showing states before and after sleeve interference-fitting of the sleeve member applied to various embodiments (MU type, LC type, and SC type) as the ferrule assembly of an optical connector of the present disclosure, and shows a structure in which setting reference line $L_R$ defined by inclined surface 20A of the positioning part coincides with edge line E1 of flange 130A. Specifically, the upper row of FIG. 8 (in FIG. 8, referred to as "MU Type") is a view showing, as one embodiment, states before and after sleeve interference-fitting of the sleeve member applied to the MU type optical connector. The middle row of FIG. 8 (in FIG. 8, referred to as "LC Type") is a view showing, as one embodiment, states of the sleeve member applied to the LC type optical connector before and after sleeve interference-fitting. The lower row of FIG. 8 (in FIG. 8, referred to as "SC Type") is a view showing, as one embodiment, states of the sleeve member applied to the SC type optical connector before and after sleeve interference-fitting. It is noted that, each edge of flange 130A, flange 130B, and flange 130C shown in FIG. 8 also corresponds to edge 135 on the front surface side of flange 130A or flange portion 520 shown in FIG. 4 same as in FIG. 7.

Figure 9:
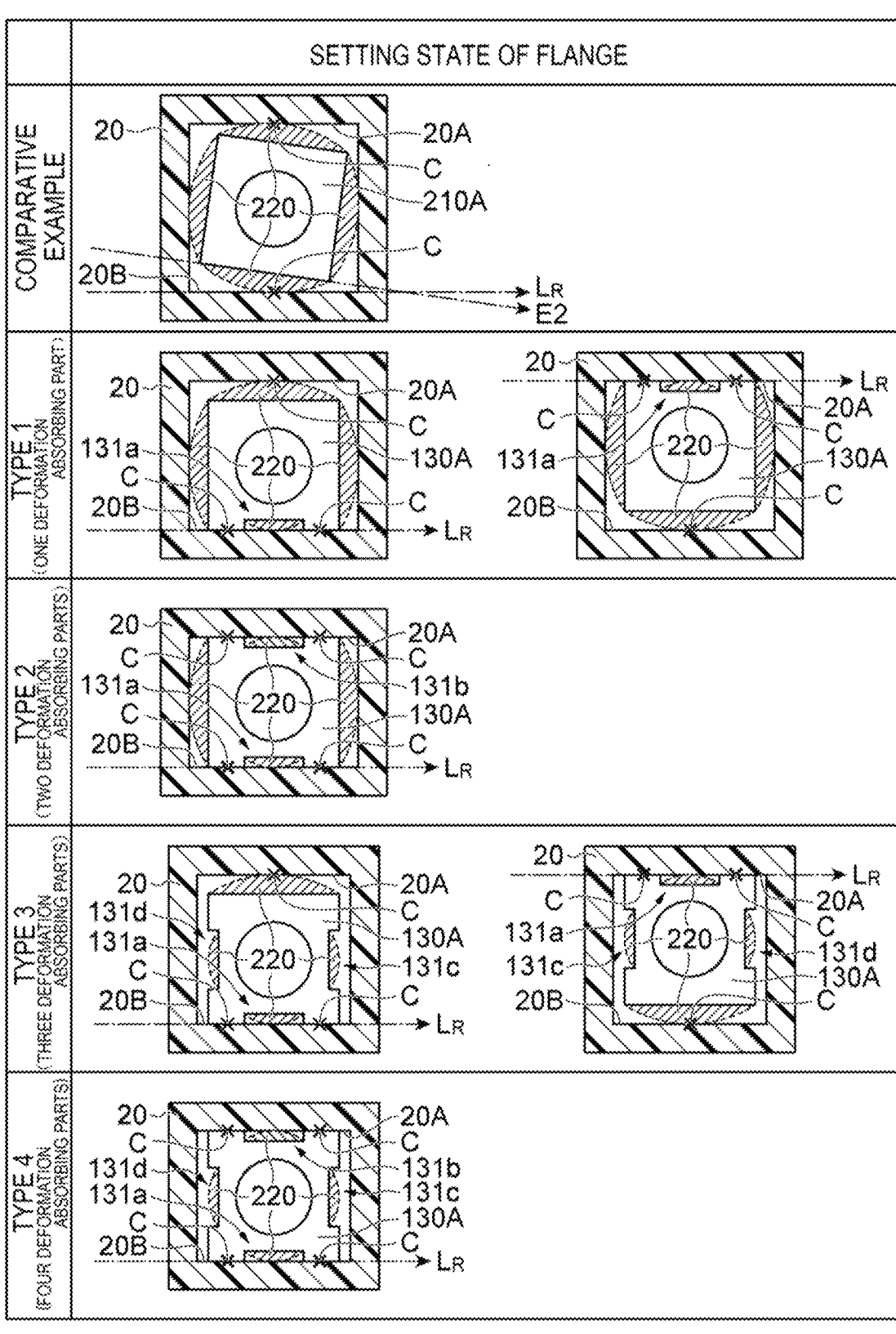
FIG. 9 is a view showing a setting state (after sleeve interference-fitting) of the flange of the sleeve member applied to the MU type embodiment and having a different number of edges provided with a deformation absorbing part in the ferrule assembly of the optical connector of the present disclosure, together with a case of the comparative example.

FIG. 9 shows, in the ferrule assembly of the optical connector of the present disclosure, the setting state (after sleeve interference-fitting) of the flange which constitutes the sleeve member applied to the MU type embodiment and differs in the number of edges (for example, refer to FIG. 4, etc.) provided with the deformation absorbing part, together with the case of the comparative example. Specifically, the uppermost row of FIG. 9 (in FIG. 9, referred to as "Comparative Example") shows the setting state of flange 210A of the comparative example in which the deformation absorbing part is not provided at each side is shown. The second row of FIG. 9 (in FIG. 9, referred to as "Type 1 (One Deformation Absorbing Part)") shows the setting state of flange 130A provided with the deformation absorbing part (cutout part 131a) on one side. The third row of FIG. 9 (in FIG. 9, described as "Type 2 (Two Deformation Absorbing Parts)") shows the setting state of flange 130A provided with deformation absorbing parts (cutout part 131a and cutout part 131b) at two opposing sides. The fourth row of FIG. 9 (in FIG. 9, described as "Type 3 (Three Deformation Absorbing Parts)") shows the setting state of flange 130A provided with deformation absorbing parts (cutout part 131a cutout part 131c and cutout part 131d) at three adjacent sides. The lowermost row of FIG. 9 (in FIG. 9, described as "Type 4 (Four Deformation Absorbing Parts)") shows the setting state of flange 130A provided with deformation absorbing parts (cutout part 131a to cutout part 131d) at all four sides.

Figure 10:
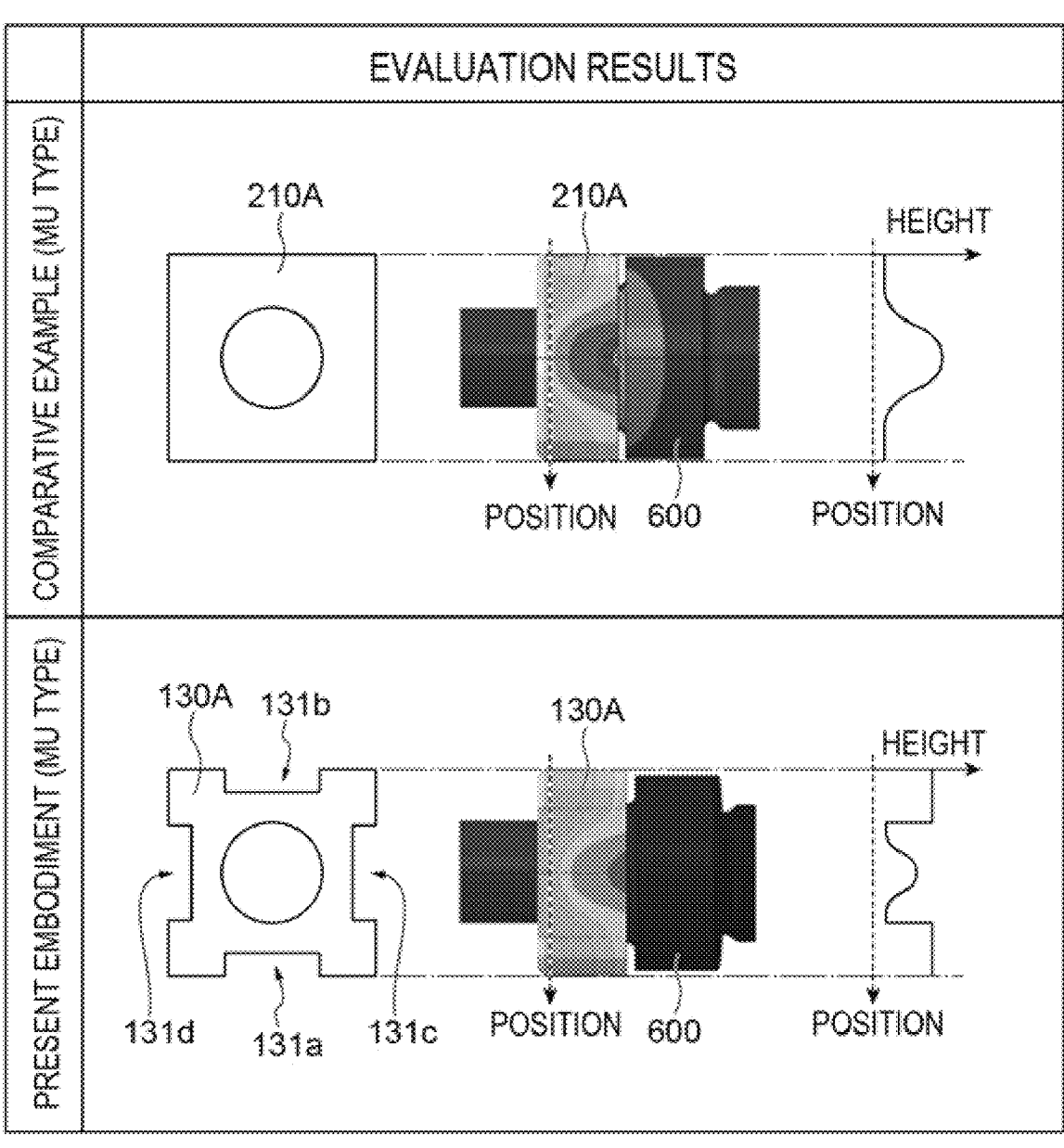
FIG. 10 is a view showing the results of evaluating the shape change of the flange (MU type) in a state where the sleeve is interference-fitted for the comparative example and the present embodiment.

FIG. 10 is a view showing the results of evaluating the shape change of the flange (MU Type) in a state where the sleeve is interference-fitted for the comparative example and the present embodiment (in FIG. 10, referred to as "Evaluation Results"). Specifically, the upper row of FIG. 10 (in FIG. 10, described as "Comparative Example (MU Type)") is a view showing the evaluation result of the shape change of the flange (constituting a part of the sleeve member) in the comparative example. The lower row of FIG. 10 (in FIG. 10, referred to as "Present Embodiment (MU Type)") is a view showing the evaluation result of the shape change of the flange (constituting a part of the sleeve member) in the present embodiment.

First, flange 210A of the comparative example applied to the MU type optical connector is described. The shape of the flange surface (the surface located on the side where ferrule 110 is provided) of flange 210A of the comparative example shown in the upper row of FIG. 6 is quadrangle. Before sleeve interference-fitting, edge line E2 of the flange surface of flange 210A is designed to coincide with setting reference line $L_R$ (defined on facing surface 20B which contacts edge 135 of flange 210A shown in FIG. 5). However, since deformation portion 220 is generated in the outer peripheral portion of flange 210A due to sleeve interference-fitting, edge line E2 and setting reference line $L_R$ are separated from each other through deformation portion 220. That is, since deformation portion 220 and facing surface 20B come into contact with each other at substantially one point, there is a possibility that flange 210A of the comparative example rotates in the direction indicated by an arrow S3. The uppermost row of FIG. 9 shows the setting state of flange 210A (comparative example) after sleeve interference-fitting in front housing 20. As can be seen from the example of the uppermost row in FIG. 9, flange 210A according to the comparative example comes into contact only at two points (contact points C shown in the view) including inclined surface 20A and facing surface 20B of the positioning part. Therefore, in flange 210A according to the comparative example, the reference direction (the direction indicated by the line $L_A$ shown in the third row and the lowermost row in FIG. 1) cannot be determined.

On the other hand, the shape of the front surface (for example, corresponding to front surface 130a shown in the upper row of FIG. 4) of flange 130A (500) of the present embodiment shown in the upper row of FIG. 7 is quadrangle. Before sleeve interference-fitting, the edge (corresponding to edge 135 shown in FIG. 4) of the front surface of flange 130A which coincides with edge line E2 is provided with cutout part 131a (521a) as a deformation absorbing part. Cutout part 131a is designed so that two contact portions located on edge line E2 and disposed on both sides of cutout part 131a coincide with setting reference line $L_R$ on facing surface 20B. After sleeve interference-fitting, deformation portion 220 is also generated in the outer peripheral portion of flange 130A, but deformation portion 220 generated at the edge coinciding with edge line E2 is generated in cutout part 131a, so that the rotation of entire flange 130A with respect to facing surface 20B is effectively suppressed. Therefore, in the present embodiment, even after sleeve interference-fitting, the state where edge line E2 and setting reference line $L_R$ coincide with each other is maintained.

The example shown in the upper row of FIG. 8 also has the same effects as the example shown in the upper row of FIG. 7. That is, the shape of the front surface of flange 130A (500) is quadrangle, and before sleeve interference-fitting, the edge (corresponding to edge 135 shown in FIG. 4) of the front surface of flange 130A which coincides with edge line E1 is provided with a cutout part 131a (521a) as a deformation absorbing part. Cutout part 131a is designed so that two contact portions located on edge line E1 and disposed on both sides of cutout part 131a coincide with setting reference line $L_R$ on inclined surface 20A. That is, the example shown in the upper row of FIG. 8 is different from the example shown in the upper row of FIG. 7 in that two contact portions disposed on both sides of cutout part 131a come into contact with inclined surface 20A. After sleeve interference-fitting, deformation portion 220 generated at the edge coinciding with edge line E1 is generated in cutout part 131a, so that the rotation of entire flange 130A with respect to inclined surface 20A is effectively suppressed. Therefore, in the present embodiment, even after sleeve interference-fitting, the state where edge line E1 and setting reference line $L_R$ coincide with each other is maintained.

It is noted that, in the example shown in the upper row of FIG. 7, of the edge of flange 130A coinciding with edge line E2, the contact portions disposed on both sides of cutout part 131a come into contact with facing surface 20B, and, in this case, as shown in the second row (left side) of FIG. 9, flange 130A comes into contact with the inner wall surface of front housing 20 at a total of three points (contact points C shown in the view) including one point on inclined surface 20A and two points on facing surface 20B. Similarly, in the example shown in the upper row of FIG. 8, of the edge of flange 130A coinciding with edge line E1, the contact portions disposed on both sides of cutout part 131a come into contact with inclined surface 20A, and, in this case, as shown in the second row (right side) of FIG. 9, flange 130A comes into contact with the inner wall surface of front housing 20 at a total of three points (contact points C shown in the view) including two points on inclined surface 20A and one point on facing surface 20B. Therefore, according to the each example shown in the upper row of FIG. 7 and the upper row of FIG. 8, even when the machining accuracy of flange 130A is low, the parallel state between line $L_A$ indicating the reference direction and setting reference line $L_R$ can be maintained.

In flange 130A provided with cutout part 131a and cutout part 131b on the opposing edges coinciding with edge line E1 and edge line E2, respectively, as shown in the third row of FIG. 9, the contact portions disposed on both sides of cutout part 131a contact facing surface 20B, while the contact portions disposed on both sides of a cutout part 131b contact inclined surface 20A. In this case, flange 130A comes into contact with the inner wall surface of front housing 20 at a total of four points (contact points C shown in the view) including two points on inclined surface 20A and two points on facing surface 20B. Therefore, according to the example of flange 130A provided with cutout part 131a and cutout part 131b on the two opposing edges, when the processing accuracy of flange 130A is increased to make the two opposing edges parallel to each other, the parallel state between line $L_A$ indicating the reference direction and setting reference line $L_R$ can be maintained with higher accuracy. However, a sufficient clearance is secured between flange 130A and the inner wall surface of front housing 20 that connects inclined surface 20A and facing surface 20B in consideration of the occurrence of deformation portion 220.

Flange 130A provided with cutout part 131c and a cutout part 131d at the edges coinciding with an edge line E3 and edge line E4, respectively, can achieve a configuration in which the contact portions disposed on both sides of cutout part 131a on edge line E2 contact facing surface 20B (fourth row (left side) in FIG. 9) and a configuration in which the contact portions disposed on both sides of cutout part 131a on edge line E1 contact inclined surface 20A (fourth row (right side) in FIG. 9). In this example, the contact portions disposed on both sides of cutout part 131c and the contact portions disposed on both sides of cutout part 131d do not contact the inner wall surface of front housing 20. In addition, flange 130A contacts the inner wall surface of front housing 20 at a total of three points (contact points C shown in the view) including one point on inclined surface 20A and two points on facing surface 20B, or contacts the inner wall surface of front housing 20 at a total of three points (contact points C shown in the view) including two points on inclined surface 20A and one point on facing surface 20B. According to the example shown in the fourth row of FIG. 9, as in the example of the second row of FIG. 9, even when the machining accuracy of flange 130A is low, the parallel state between line $L_A$ indicating the reference direction and setting reference line $L_R$ can be maintained.

Further, in flange 130A provided with cutout parts 131a to 131d on the edges coinciding with edge line E1 to edge line E4, as shown in the lowermost row of FIG. 9, the contact portions disposed on both sides of cutout part 131a on edge line E2 contact facing surface 20B, while the contact portions disposed on both sides of cutout part 131b on edge line E1 contact inclined surface 20A. In this example, the contact portions disposed on both sides of cutout part 131c and the contact portions disposed on both sides of cutout part 131d do not contact the inner wall surface of front housing 20. In addition, flange 130A contacts the inner wall surface of front housing 20 at a total of four points (contact points C shown in the view) including two points on inclined surface 20A and two points on facing surface 20B. According to the example shown in the lowermost row of FIG. 9, as in the example of the third row of FIG. 9, when the processing accuracy of flange 130A is increased to make the two opposing edges parallel to each other, the parallel state between line $L_A$ indicating the reference direction and setting reference line $L_R$ can be maintained with higher accuracy. In addition, a sufficient clearance is secured between flange 130A and the inner wall surface of front housing 20 that connects inclined surface 20A and facing surface 20B in consideration of the occurrence of deformation portion 220.

As can be seen from the evaluation result shown in the upper row of FIG. 10, in the case (testing machine 600 in which the sleeve portion is interference-fitted to flange 210A) of flange 210A of the comparative example having the above-described structure (no deformation absorbing part at each edge contacting inclined surface 20A and facing surface 20B of the positioning part), it can be confirmed that a large deformation occurs at the edge of flange 210A. On the other hand, as can be seen from the evaluation result shown in the lower row of FIG. 10, in the case (testing machine 600 in which the sleeve portion is interference-fitted to flange 130A) of flange 130A of the present disclosure having the flange structure (having deformation absorbing part at all edges of flange 130A) shown in the lowermost row of FIG. 9, since the deformation generated at the edge of flange 130A is absorbed in each of cutout parts 131a to 131d, which are the deformation absorbing parts, it can be confirmed that the deformation of flange 130A caused by sleeve interference-fitting does not affect the change in the contact state between inclined surface 20A and facing surface 20B of the positioning part, and the edge of flange 130A.

Next, flange 210B of the comparative example applied to the LC type optical connector is described. The shape of the flange surface (the surface located on the side where ferrule 110 is provided) of flange 210B of the comparative example shown in the middle row of FIG. 6 is hexagonal. Before sleeve interference-fitting, edge line E2 of the flange surface of flange 210B is designed to coincide with setting reference line $L_R$ of facing surface 20B of the corresponding positioning part. However, since deformation portion 220 is generated in the outer peripheral portion of flange 210B due to sleeve interference-fitting, edge line E2 and setting reference line $L_R$ are separated from each other through deformation portion 220. That is, since deformation portion 220 and facing surface 20B of the positioning part contact each other at substantially one point, there is a possibility that flange 210B of the comparative example rotates in the direction indicated by arrow S3.

On the other hand, the shape of the front surface (for example, corresponding to front surface 130a shown in the upper row of FIG. 4) of flange 130B of the present embodiment shown in the middle row of FIG. 7 is also hexagonal. Before sleeve interference-fitting, a cutout part 132a is designed so that two contact portions located on edge line E2 and disposed on both sides of cutout part 132a coincide with setting reference line $L_R$ on facing surface 20B of the positioning part. After sleeve interference-fitting, deformation portion 220 is also generated in the outer peripheral portion of flange 130B, but deformation portion 220 generated in the edge corresponding to edge line E2 is generated in cutout part 132a, so that the shape change of flange 130B as a whole is hardly occurred. Therefore, in the present embodiment, even after sleeve interference-fitting, the state where edge line E2 and setting reference line $L_R$ coincide with each other is maintained.

The example shown in the middle row of FIG. 8 also has the same effects as the example shown in the middle row of FIG. 7. That is, the shape of the front surface of flange 130B is hexagonal, and, before sleeve interference-fitting, the edge of the front surface of flange 130B coinciding with edge line E1 is provided with cutout part 132a as the deformation absorbing part. Cutout part 132a is designed so that two contact portions located on edge line E1 and disposed on both sides of cutout part 132a coincide with setting reference line $L_R$ on inclined surface 20A. That is, the example shown in the middle row of FIG. 8 is different from the example shown in the middle row of FIG. 7 in that two contact portions disposed on both sides of cutout part 132a contact inclined surface 20A. After sleeve interference-fitting, deformation portion 220 generated at the edge coinciding with edge line E1 is generated in cutout part 132a, so that the rotation of entire flange 130B with respect to inclined surface 20A is effectively suppressed. Therefore, in the present embodiment, even after sleeve interference-fitting, the state where edge line E1 and setting reference line $L_R$ coincide with each other is maintained.

Next, flange 210C of the comparative example applied to the SC type optical connector is described. The shape of the flange surface (the surface located on the side where ferrule 110 is provided) of flange 210C of the comparative example shown in the lower row of FIG. 6 is circular, and grooves (having bottoms contacting with inclined surface 20A and facing surface 20B of the positioning part) for suppressing rotation of flange 210C are provided in four directions when viewed from the center thereof. Before sleeve interference-fitting, edge line E2 of the flange surface of flange 210C is designed to coincide with setting reference line $L_R$ on facing surface 20B of the corresponding positioning part. However, since deformation portion 220 is generated in the outer peripheral portion of flange 210C due to sleeve interference-fitting, edge line E2 and setting reference line $L_R$ are separated from each other through deformation portion 220. That is, since deformation portion 220 and facing surface 20B of the positioning part contact each other at substantially one point, there is a possibility that flange 210C of the comparative example rotates in the direction indicated by arrow S3.

On the other hand, the shape of the front surface (for example, corresponding to front surface 130a shown in the upper row of FIG. 4) of flange 130C of the present embodiment shown in the lower row of FIG. 7 is circular, and as in the above-described SC type comparative example, grooves (having bottoms contacting inclined surface 20A and facing surface 20B of the positioning part) for suppressing rotation of flange 130C are provided in four directions when viewed from the center. Before sleeve interference-fitting, a cutout part 133a is designed so that two contact portions located on edge line E2 and disposed on both sides of cutout part 133a coincide with setting reference line $L_R$ on facing surface 20B. After sleeve interference-fitting, deformation portion 220 is also generated in the outer peripheral portion of flange 130C, but deformation portion 220 generated in the edge coinciding with edge line E2 is generated in cutout part 133a, so that the shape change of flange 130C as a whole is hardly occurred. Therefore, in the present embodiment, even after sleeve interference-fitting, the state where edge line E2 and setting reference line $L_R$ coincide with each other is maintained.

The example shown in the lower row of FIG. 8 also has the same effects as the example shown in the lower row of FIG. 7 described above. That is, the shape of the front surface of flange 130C is circular, and grooves (having bottoms contacting inclined surface 20A and facing surface 20B of the positioning part) for suppressing the rotation of flange 130C are provided in four directions when viewed from the center of the front surface. Before sleeve interference-fitting, cutout part 133a is designed so that two contact portions located on edge line E1 and disposed on both sides of cutout part 133a coincide with setting reference line $L_R$ on inclined surface 20A. That is, the example shown in the lower row of FIG. 8 is different from the example shown in the lower row of FIG. 7 in that two contact portions disposed on both sides of cutout part 133a contact inclined surface 20A. After sleeve interference-fitting, deformation portion 220 generated at the edge coinciding with edge line E1 is generated in cutout part 133a, so that the rotation of entire flange 130C with respect to inclined surface 20A is effectively suppressed. Therefore, in the present embodiment, even after sleeve interference-fitting, the state where edge line E1 and setting reference line $L_R$ coincide with each other is maintained.

In the above-described embodiment, the positioning part is constituted by inclined surface 20A provided on the upper side of front housing 20 and flat facing surface 20B provided on the lower side of front housing 20. However, the inclined surface may be provided on the lower side of front housing 20 and the flat facing surface may be provided on the upper side of front housing 20. Furthermore, inclined surfaces may be provided on both the upper and lower sides of front housing 20.

REFERENCE SIGNS LIST

10 optical connector
20 front housing

20A inclined surface (positioning part)
20B facing surface (positioning part)
30 rear housing
40 boots
50 optical fiber
50A MCF (multi-core optical fiber)
50B PMF (polarization maintaining optical fiber)
51, 51A, 51B glass fiber
52A, 52B core
53A, 53B common cladding
54 stress applying part
100 ferrule assembly
110 ferrule
120 sleeve
120a front end surface
120b rear end surface
130A to 130C flange
130a front surface
130b rear surface
131a to 131d, 132a, 133a, 521a cutout part (deformation absorbing part)
132 through hole
135 edge
140 spring member (elastic body)
220 deformation portion
500 integrated sleeve member
510 sleeve portion
520 flange portion
530 through hole
AX fiber axis (central axis)
E1 to E4 edge line
$L_A$ line (line indicating reference direction)
$L_R$ setting reference line
S1 to S3 translational or rotational direction.

The invention claimed is:

1. An optical connector comprising:

an optical fiber;

a ferrule assembly attached to a tip portion of the optical fiber; and a housing having an inner wall surface and a positioning part, the inner wall surface defining a space in which the ferrule assembly is to be accommodated, the positioning part defining an accommodation position of the ferrule assembly, wherein the positioning part is provided on the inner wall surface, and is defined by an inclined surface and a facing surface, the inclined surface being inclined with respect to a central axis of the tip portion of the optical fiber and being a surface with which a part of the ferrule assembly is to contact, the facing surface being positioned on a side opposite to the inclined surface with respect to the ferrule assembly and being a surface with which a part of the ferrule assembly is to contact, wherein the ferrule assembly includes a ferrule; and a sleeve member constituted by a sleeve and a flange, the sleeve having a front end surface and a rear end surface facing each other, the flange including edges each at least partly contacting the inclined surface and the facing surface of the positioning part, wherein the sleeve has a through hole connecting the front end surface and the rear end surface to each other and receiving a part of the ferrule from a side where the front end surface is provided before the tip portion of the optical fiber is attached thereto or after the tip portion of the optical fiber has been attached thereto, and wherein an outer peripheral portion of the flange includes:

a first edge facing at least one of the inclined surface and the facing surface of the positioning part, and a second edge opposite the first edge, each of the first edge and the second edge includes a set including a deformation absorbing part and two contact portions, the deformation absorbing part being provided for suppressing deformation of the flange, the contact portions being disposed on both sides of the deformation absorbing part, and being configured to contact at least one of the inclined surface and the facing surface of the positioning part.

2. The optical connector according to claim 1, wherein the deformation absorbing part includes a cutout part for separating a part of the flange from the positioning part by a predetermined distance.

3. The optical connector according to claim 1, wherein the sleeve member is constituted by a single member, and the sleeve and the flange are each a portion of the single member.

4. The optical connector according to claim 1, further comprising:

an elastic body contacting the flange from a side where the rear end surface is provided, the elastic body being provided for pushing the first edge of the flange against the inclined surface of the positioning part.

5. The optical connector according to claim 1, wherein the optical fiber is a multi-core optical fiber or a polarization maintaining optical fiber.

6. The optical connector according to claim 1, wherein the outer peripheral portion of the flange includes:

the first edge provided on a front-side surface of the flange, the second edge opposite the first edge along a transverse direction orthogonal to a longitudinal direction of the ferrule and provided on the front-side surface of the flange, a third edge opposite the first edge along the longitudinal direction and provided on a rear-side surface of the flange, a fourth edge opposite the third edge along the transverse direction and provided on the rear-side surface of the flange, among the first, second, third, and fourth edges, only the first edge contacts and is pushed against the inclined surface.

* * * * *